United States Patent Office 2,783,139
Patented Feb. 26, 1957

2,783,139

PROCESS OF PRODUCING AMMONIATED SUPERPHOSPHATES

Richard C. Datin, Petersburg, Va., assignor to Allied Chemical & Dye Corporation, New York, N. Y., a corporation of New York No Drawing. Application May 13, 1953,
Serial No. 354,881

13 Claims. (Cl. 71—37)

This invention relates to the production of fertilizers, and more particularly to the production of ammoniated superphosphates.

The ammoniation of superphosphates employing about 1.3 mols of ammonia or less per mol of $P_2O_5$ to convert part of the water-soluble mono-calcium acid phosphate to "citrate-soluble" phosphates is well known. Use of larger amounts of ammonia, to introduce additional nitrogen, conveniently and inexpensively supplied by ammonia, results in reversion of water-soluble and citrate-soluble phosphates in which form it is available as plant food, to a citrate-insoluble form, i. e., the forms of $P_2O_5$ unavailable as plant food and insoluble in ammonium citrate solutions as determined by the procedure of analysis of the Association of Official Agricultural Chemists (Methods of Analysis, 7th ed., Washington, 1950). It has been found that the amount of $P_2O_5$ reversion to the citrate-insoluble form tends to increase with an increase in the quantity of ammonia added to the superphosphates.

While the causes for reversion to citrate-insoluble $P_2O_5$ are not known, it is believed by many researchers in this field that it is due to reaction of tricalcium phosphate and calcium fluoride present in highly ammoniated superphosphate to form fluorapatite $(3Ca_3(PO_4)_2CaF_2)$. Phosphate rocks generally used in making ammoniated superphosphate contain from 2 to 4.5% of fluorine which is ample to cause reversion.

It is among the objects of this invention to provide a process of producing ammoniated superphosphates containing citrate-soluble $P_2O_5$ which has little or substantially no tendency to revert to the citrate-insoluble form and this notwithstanding that substantially in excess of 1.3 mols of ammonia are employed per mol of $P_2O_5$ in the ammoniation of the superphosphate.

Other objects and advantages of this invention will be apparent from the following detailed description thereof.

In accordance with this invention the acidulation of the phosphate rock is carried out in the presence of sodium ion, desirably from 0.25% to 10% sodium and preferably from 1.0% to 5% sodium based on the weight of solids in the superphosphate. Surprisingly, it has been found that by carrying out the acidulation of the phosphate rock in the presence of sodium ion, and thereafter ammoniating the superphosphate thus produced, employing a much greater amount of ammonia than 1.3 mols of ammonia per mol of $P_2O_5$, for example 1.6 mols of ammonia per mol of $P_2O_5$ and even more an ammoniated superphosphate results in which there is materially less tendency for reversion of citrate-soluble $P_2O_5$ to the citrate-insoluble form to take place.

One possible explanation for the unexpected behavior of the presence of the sodium ion during acidulation to materially minimize reversion of $P_2O_5$ in the ammoniated product to the citrate-insoluble form is that the presence of the sodium blocks the normal formation of fluorapatite and/or results in the formation of a presently unknown complex $P_2O_5$ compound containing sodium having a relatively high solubility in ammonium citrate solution, and, hence, high $P_2O_5$ availability as a plant nutrient. This explanation is advanced in the interests of facilitating a better understanding of the invention, and with the understanding that this invention is not to be limited thereby.

The sodium ion is introduced just prior to or during the acidulation in the form of a sodium compound, e. g., a sodium salt such as sodium nitrate, sodium chloride, sodium sulfate, sodium phosphate, sodium borate, sodium carbonate, or other sodium salt including sodium fluoride, which however is somewhat less effective in decreasing phosphate reversion than most of the other sodium salts above enumerated. Should sodium be added as such or as hydroxide it would react with the acid employed to effect the acidulation, to form the salt of the acid. Hence, since sodium or its hydroxide is more expensive and more difficult to handle than the salt, it is preferred to use the salt. The sodium ion may be admixed with the acid and the resultant acid salt mixture added to the phosphate rock to effect the acidulation, or it may be added to the phosphate rock before or during the addition of the acid thereto. The important factor is that the sodium be present during the acidulation. The nature of the ion associated with the sodium appears relatively unimportant; all thus far tested reduce the tendency for reversion of citrate-soluble $P_2O_5$ to the citrate-insoluble form to take place although some ions, e. g., sulfate, nitrate and chloride appear to do so better than others, e. g., the fluoride.

Two procedures are now commonly used for producing ammoniated superphosphate and this invention may be employed in connection with both to reduce the tendency for reversion of citrate-soluble $P_2O_5$ to the citrate-insoluble form to take place. In one process, only a small excess of acid, usually sulfuric acid, is used to acidulate the phosphate rock to form solid superphosphate which is ammoniated after curing. By "excess acid" in this specification is meant the amount of acid over and above the amount required to solubilize the $P_2O_5$ in the rock. In this procedure in lieu of sulfuric acid, mixed acids may be used, such as mixtures of sulfuric and nitric acids, sulfuric and phosphoric acids, or nitric and phosphoric acids. In general, in this procedure at least 3 and usually about 5 equivalents of acid per mol of $P_2O_5$ are employed to effect the acidulation. By an "equivalent of acid" is meant the quantity of acid which contains one formula weight of hydrogen ion, i. e., a half mol of $H_2SO_4$, one mol of $HNO_3$ and one mol of $H_3PO_4$. For purposes of determining the "equivalents of acid," in the processes embodying this invention, phosphoric acid is considered a monobasic acid, because mono-calcium phosphate or $CaH_4(PO_4)_2$ comprises the major portion of the phosphoric acid in superphosphates, i. e., two hydrogen ions remain with the phosphoric acid.

In the other procedure, which will be hereinafter referred to as the "slurry procedure," the phosphate rock is treated with a considerable excess of acid forming a slurry which is ammoniated immediately after its formation and the ammoniated superphosphate is then dried. The acid used may be a mixture of sulfuric and nitric acids containing sufficient sulfuric acid to form calcium sulfate with all of the calcium present in the rock in excess of that required to form dicalcium phosphate with the $P_2O_5$ content of the rock. Instead of a mixture of sulfuric and nitric acids, a mixture of nitric and phosphoric acids or a mixture of sulfuric and nitric acids, or even nitric acid alone may be used to effect the acidulation in the slurry procedure. The amount of acid used may be from 6 to 20, preferably from 6 to 15, equivalents of acid per mol of $P_2O_5$ in the phosphate rock. In the slurry procedure, it is that portion of the ammonia over and above that which is required to neutralize the excess acid, that is responsible for reversion of citrate-soluble phosphates to a citrate-insoluble form and which action is inhibited by the present invention.

As above noted, in the slurry procedure from 6 to 20, preferably from 6 to 15, equivalents of acid per mol of $P_2O_5$ in the phosphate rock are used in the acidulation step. In the other procedure hereinabove described, at least 3 and usually about 5 equivalents of acid are employed per mol of $P_2O_5$. Hence, in the acidulation step of this invention considered generically, i. e., as including both procedures, the phosphate rock may be treated with from 3 to 20, desirably 3 to 15, equivalents of acid per mol of $P_2O_5$ in the phosphate rock.

The rock and acid are desirably introduced at room temperature. The acidulation is an exothermic reaction and may be carried out at any desired temperature below that at which substantial loss of nitrogen compound takes place. The acidulation may be carried out without external cooling. By introducing the rock and acid at atmospheric temperature, the reaction mixture in general will not go above about 85° to 100° C. Preferably, the reaction mixture is left at this temperature until the acidulation reaction has been completed. The acidulation reaction is carried out in the presence of from about 15% to about 45% water based on the total weight of the constituents present in the acidulator.

The acidulated mixture, referred to hereinafter as superphosphate, is ammoniated employing from about 1.6 to 2.9 mols of ammonia per mol of $P_2O_5$ in the superphosphate. This range, refers to the range of amounts of ammonia employed in the ammoniation over and above the amount of ammonia added to neutralize the excess acid. Thus, in the first procedure hereinabove disclosed, involving the use of about 5 equivalents of acid per mol of $P_2O_5$ (which amount represents little if any excess acid) from about 1.6 to 2.9 mols of ammonia per mol of $P_2O_5$ in the superphosphate is employed in the ammoniation. In the slurry procedure the amount of ammonia used is greater by an amount equal to that required to neutralize the excess acid. The use of 1.6 mols of ammonia per mol of $P_2O_5$ (over and above the amount required to neutralize the excess acid) represents an increase of about 23% over and above the amount of ammonia heretofore used and which was generally considered the maximum permissible in order to avoid excessive reversion of $P_2O_5$ to the citrate-insoluble form.

The ammoniation is carried out in the presence of water, usually water in amount of from 7% to 10% of the ammoniated mixture will be found adequate, although larger amounts of water, as high as 50%, may be present, for example, when using 42% nitric acid or weaker acid to effect the acidulation. The ammoniated superphosphate leaving the ammoniator generally contains less water than the superphosphate ammonia reaction mixture.

Aqueous ammonia solutions or gaseous ammonia may be employed to effect the ammoniation. Also solutions of salts having fertilizer value, for example, ammonia solutions of ammonium nitrate, or of sodium nitrate, and such solutions containing urea may be employed to effect the ammoniation.

The ammoniated superphosphate mixture may be subjected to a granulation, or drying treatment, if desired, to produce the desired product. As above noted this invention includes processes in which the acidulation is carried out in the presence of sodium ion, the superphosphate thus produced is ammoniated, and the ammoniated superphosphate is used without further treatment, or is subjected to a drying or granulation treatment or is admixed with a potassium salt or other plant nutrient with or without additional treatment such as granulation of the resulting mixture.

The following examples are given for purposes of illustrating the invention; it will be understood the invention is not limited to these examples. In these examples all parts are by weight.

EXAMPLE I.—SODIUM NITRATE PRESENT DURING THE ACIDULATION 15 parts of 60% $H_2SO_4$ at a temperature of 85° C. were added to a mixture consisting of 15 parts phosphate rock, 2.80 parts sodium nitrate and 0.20 part sand, the mixture agitated for 1 minute and then maintained at 85° C. for 20 hours.

Three additional batches were prepared by the same procedure, these batches, however, containing 2.01 parts sodium nitrate and .99 part sand, 1.59 parts sodium nitrate and 1.41 parts sand, and 0.97 part of sodium nitrate and 2.03 parts sand, instead of the 2.80 parts sodium nitrate and 0.2 part sand of the first-mentioned batch. Thus each batch consisted of thirty-three parts; the sodium nitrate and sand content of all batches consisted of 3 parts but the relative amounts of sand and sodium nitrate from batch to batch differed as noted above.

For purposes of comparison a fifth batch was prepared in the same manner, except that no sodium nitrate was used and 3 parts of sand were mixed with the 15 parts of phosphate rock subjected to acidulation.

Like portions of each batch were ammoniated employing a solution containing 21.7% ammonia, 65% ammonium nitrate and 13.3% water. 0.29 pound of this solution was used per pound of superphosphate. The ammoniation was carried out at atmospheric pressure, with a water content of 10% of the total mixture and took ½ minute to spray the ammonia solution on each batch followed by mixing for about 5 minutes. Thereafter each batch was stored at 80° C. for 30 days. The batches were then analyzed to determine their total $P_2O_5$ and citrate-insoluble $P_2O_5$. These analyses were carried out by regular Association of Official Agricultural Chemists procedures. The results are given in the table which follows:

Table I

|  | Percent Na (added as $NaNO_3$) present during acidulation | Percent Na (added as $NaNO_3$) present in the ammoniated product | Percent unavailable $P_2O_5$ (100 × citrate-insoluble $P_2O_5$ ÷ total $P_2O_5$) |
|---|---|---|---|
| Comparative batch | 0 | 0 | 20.5 |
| Batch No. 1 | 0.8 | 0.6 | 6.1 |
| Batch No. 2 | 1.3 | 1.0 | 1.5 |
| Batch No. 3 | 1.7 | 1.3 | 0.9 |
| Batch No. 4 | 2.3 | 1.7 | 0.6 |

EXAMPLE II.—SODIUM SULFATE PRESENT DURING THE ACIDULATION

Four batches were prepared following the same procedure in Example I, one batch being an ammoniated superphosphate in which no sodium was present during the acidulation and the other three batches involving the amount of sodium, as sodium sulfate, present during the acidulation given in Table II below. These batches were ammoniated and then analyzed to determine their total $P_2O_5$ and citrate-insoluble $P_2O_5$ by the same procedures followed in Example I. The results are as follows:

Table II

|  | Percent Na (added as $Na_2SO_4$) present during acidulation | Percent Na (added as $Na_2SO_4$) present in the ammoniated product | Percent unavailable $P_2O_5$ (100 × citrate-insoluble $P_2O_5$ ÷ total $P_2O_5$) |
|---|---|---|---|
| Comparative batch | 0 | 0 | 12.8 |
| Batch No. 5 | 1.3 | 0.94 | 2.48 |
| Batch No. 6 | 1.7 | 1.23 | 1.00 |
| Batch No. 7 | 2.3 | 1.67 | 0.77 |

EXAMPLE III.—SODIUM CHLORIDE PRESENT DURING THE ACIDULATION

The technique followed was the same as in the other examples, except that sodium chloride was the salt employed to furnish sodium ion in the amounts indicated in Table III which gives the results of the analyses of the batches subject to test:

Table III

| | Percent Na (added as NaCl) present during acidulation | Percent Na (added as NaCl) present in the ammoniated product | Percent unavailable $P_2O_5$ ($100 \times$ citrate-insoluble $P_2O_5 \div$ total $P_2O_5$) |
|---|---|---|---|
| Comparative batch | 0 | 0 | 13.8 |
| Batch No. 8 | 1.3 | 0.94 | 1.9 |
| Batch No. 9 | 1.7 | 1.2 | 0.95 |
| Batch No. 10 | 2.3 | 1.7 | 1.35 |

EXAMPLE IV.—SODIUM FLUORIDE PRESENT DURING THE ACIDULATION

The technique followed was the same as in the other examples, except that sodium fluoride was the salt employed to introduce the sodium ion during the acidulation. This salt was introduced to furnish sodium ion in the amounts indicated in Table IV which gives the results of the analyses of the batches subjected to test:

Table IV

| | Percent Na (added as NaF) present during acidulation | Percent Na (added as NaF) present in the ammoniated product | Percent unavailable $P_2O_5$ ($100 \times$ citrate-insoluble $P_2O_5 \div$ total $P_2O_5$) |
|---|---|---|---|
| Comparative batch | 0 | 0 | 10.75 |
| Batch No. 11 | 1.7 | 1.2 | 4.4 |
| Batch No. 12 | 2.3 | 1.7 | 2.8 |

EXAMPLE V.—SODIUM NITRATE PRESENT DURING THE ACIDULATION WITH MIXED ACID

Two superphosphates (mix 1 and mix 2, respectively) were made as follows:

For mix 1, 23.5 pounds of 42% nitric acid and 5.5 pounds of 94% sulfuric acid were added to 21 pounds of phosphate rock. For mix 2, 23 pounds of 42% nitric acid containing 1 pound of dissolved sodium nitrate and 5.4 pounds of 94% sulfuric acid were added to 20.6 pounds of phosphate rock.

A portion of each mix was ammoniated with a solution containing 21.7% ammonia, 65% ammonium nitrate and 13.3% water. Approximately 8.24 pounds of solution were used per pound of the superphosphate. The products were stored at 50° C. for 30 days with a moisture content of approximately 11%. The ammoniated products were analyzed for citrate-insolubles before and after storage, and its was found that the ammoniated product from mix 2 containing sodium added during the acidulation showed materially less reversion in storage than the ammoniated product from mix 1 which did not contain any added sodium.

From the above examples it will be noted the presence of the sodium ion during the acidulation results in a very material reduction in the formation of citrate-insoluble $P_2O_5$ as compared with acidulation procedure followed by subsequent ammoniation under the same conditions, except for the omission of the sodium ion during the acidulation.

It is an important feature of this invention that the sodium ion be present during the acidulation, i. e., added before the acidulation of the phosphate rock has been completed. The incorporation of the sodium ion during the ammoniation does not give the same results. In a series of comparative tests involving the incorporation of the same quantity of sodium nitrate (1.1% Na based on the weight of ammoniated product) it was found that the incorporation of the sodium during the ammoniation resulted in a decrease of only 23% in the amount of citrate-insoluble $P_2O_5$ in the ammoniated product after storage for 30 days at 80° C., whereas the incorporation of the same amount of sodium ion during the acidulation resulted in a decrease of 92% under the same test conditions.

Since certain changes may be made in carrying out the above process without departing from the scope of the invention, it is intended that all matter contained in the above description shall be interpreted as illustrative and not in a limiting sense.

What is claimed is:

1. The process of producing ammoniated superphosphate which comprises acidulating phosphate rock containing fluorine in the presence of added sodium ion and thereafter ammoniating the superphosphate produced by the acidulation employing at least 1.6 mols of ammonia per mol of $P_2O_5$ over and above the amount of ammonia required to neutralize that portion of the acid employed during the acidulation which is in excess over that required to solubilize the $P_2O_5$ in the phosphate rock.

2. The process defined in claim 1, in which from 0.25% to 10% by weight of sodium, based on the weight of solids in the superphosphate, is present during the acidulation.

3. The process defined in claim 1, in which from 1% to 5% by weight of sodium, based on the weight of solids in the superphosphate, is present during the acidulation.

4. The process of producing ammoniated superphosphate which comprises acidulating phosphate rock containing fluorine employing from 3 to 20 equivalents of acid per mol of $P_2O_5$ in the phosphate rock and in the presence of from 0.25% to 10% by weight of sodium, based on the weight of solids in the superphosphate, and ammoniating the superphosphate thus produced employing at least 1.6 mols of ammonia per mol of $P_2O_5$ over and above the amount of ammonia required to neutralize that portion of the acid employed during the acidulation which is in excess over that required to solubilize the $P_2O_5$ in the phosphate rock.

5. The process of producing ammoniated super-phosphate which comprises acidulating phosphate rock containing from 2% to 4.5% by weight of fluorine employing from 3 to 20 equivalents of acid per mol of $P_2O_5$ in the phosphate rock and in the presence of from 0.25% to 10% by weight of sodium, based on the weight of solids in the super-phosphate, and ammoniating the super-phophate thus produced employing from about 1.6 to about 2.9 mols of ammonia per mol of $P_2O_5$ over and above the amount of ammonia required to neutralize that portion of the acid employed during the acidulation which is in excess over that required to solubilize the $P_2O_5$ in the phosphate rock.

6. The process of producing ammoniated superphosphate which comprises acidulating phosphate rock containing from 2% to 4.5% by weight of fluorine employing from 3 to 15 equivalents of acid per mol of $P_2O_5$ in the phosphate rock and in the presence of from 1% to 5% by weight of sodium, based on the weight of solids in the superphosphate, and ammoniating the superphosphate thus produced employing from about 1.6 to about 2.9 mols of ammonia per mol of $P_2O_5$ over and above the amount of ammonia required to neutralize that portion of the acid employed during the acidulation which is in excess over that required to solubilize the $P_2O_5$ in the phosphate rock.

7. The process defined in claim 6, in which the sodium is present during the acidulation in the form of sodium nitrate.

8. The process defined in claim 6, in which the sodium is present during the acidulation in the form of sodium chloride.

9. The process defined in claim 6, in which the sodium is present during the acidulation in the form of sodium fluoride.

10. The process defined in claim 6, in which the sodium is present during the acidulation in the form of sodium sulfate.

11. The process defined in claim 6, in which the sodium is present during the acidulation in the form of sodium phosphate.

12. A process of producing ammoniated superphosphate which comprises treating phosphate rock containing from 2% to 4.5% by weight of fluorine with about 5 equivalents of sulfuric acid per mol of $P_2O_5$ in the rock and in the presence of from 1% to 5% by weight of sodium based on the weight of solids in the superphosphate, said sodium being present as a sodium salt, and ammoniating the superphosphate thus produced employing from about 1.6 to about 2.9 mols of ammonia per mol of $P_2O_5$ in the phosphate rock.

13. A process of producing ammoniated superphosphate which comprises treating phosphate rock containing from 2% to 4.5% by weight of fluorine with from 6 to 15 equivalents of acid per mol of $P_2O_5$ in the rock, and in the presence of from 1% to 5% by weight of sodium based on the weight of solids in the superphosphate, said sodium being present as a sodium salt, said acid consisting of a mixture of sulfuric and nitric acids containing sufficient sulfuric acid to form calcium sulfate with all of the calcium present in the rock in excess of that required to form dicalcium phosphate with the $P_2O_5$ content of the rock and ammoniating the superphosphate thus produced employing per mol of $P_2O_5$ in the phosphate rock, from about 1.6 to about 2.9 mols of ammonia over and above the amount of ammonia required to neutralize that portion of the acid employed during the acidulation which is in excess over that required to solubilize the $P_2O_5$ in the phosphate rock.

References Cited in the file of this patent

UNITED STATES PATENTS

| | | |
|---|---|---|
| 49,831 | Liebig | Sept. 5, 1865 |
| 252,029 | Gibbons et al. | Jan. 10, 1882 |
| 1,351,672 | Meigs | Aug. 21, 1920 |
| 1,637,428 | Rupp | Aug. 2, 1927 |
| 1,712,404 | Rupp | May 7, 1929 |
| 1,849,989 | Moore | Mar. 15, 1932 |
| 1,929,710 | Ober et al. | Oct. 10, 1933 |
| 1,948,520 | Harvey | Feb. 27, 1934 |
| 2,035,484 | Kniskern et al. | Mar. 31, 1936 |
| 2,739,054 | Andres et al. | Mar. 20, 1956 |

FOREIGN PATENTS

| | | |
|---|---|---|
| 5,686 | Great Britain | Apr. 27, 1886 |